G. D. SHERER.
AIR FILTERING DEVICE.
APPLICATION FILED MAY 3, 1920.
1,375,422.
Patented Apr. 19, 1921.
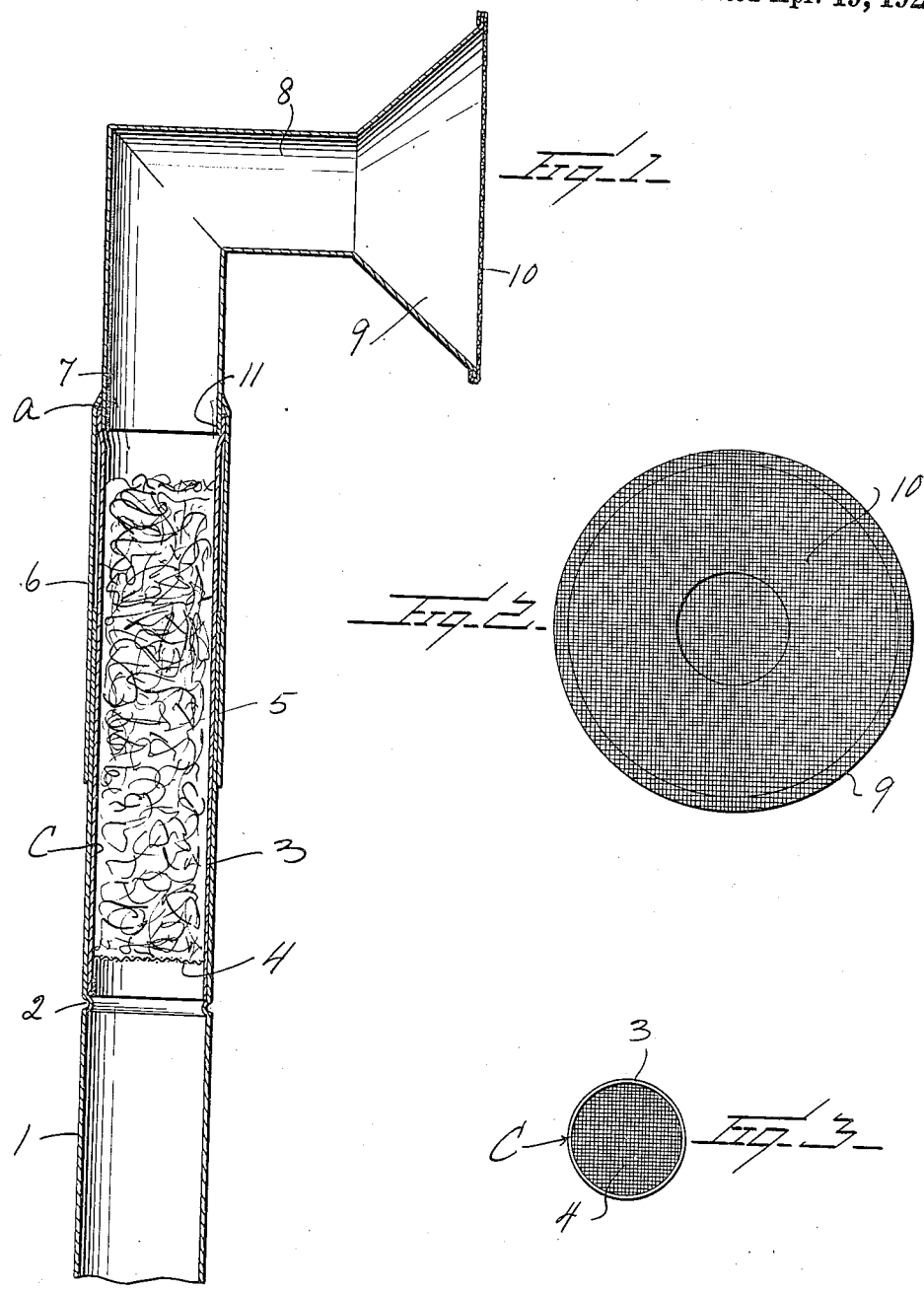

UNITED STATES PATENT OFFICE.

GLEN D. SHERER, OF CONNELL, WASHINGTON, ASSIGNOR OF TWO-FIFTHS TO LOGAN L. LONG, OF CONNELL, WASHINGTON.

AIR-FILTERING DEVICE.

1,375,422.  Specification of Letters Patent.  Patented Apr. 19, 1921.

Application filed May 3, 1920. Serial No. 378,567.

*To all whom it may concern:*

Be it known that I, GLEN D. SHERER, a citizen of the United States, residing at Connell, in the county of Franklin and State of Washington, have invented certain new and useful Improvements in Air-Filtering Devices, of which the following is a specification, reference being had to the accompanying drawings.

This invention relates to certain improvements in air filters and has relation more particularly to a device of this general character especially designed and adapted for use in connection with internal combustion engines, and it is an object of the invention to provide a novel and improved device of this general character which operates effectively to prevent dust from passing into any part of the motor.

It is also an object of the invention to provide a novel and improved device of this general character which is primarily adapted for use in connected with a carbureter of an internal combustion engine but which may be also installed on the breather pipe of the crank case.

Another object of the invention is to provide a novel and improved filter of this general character which embodies a plurality of separable parts which, when assembled, provide a conduit for the passage of air and wherein one of said parts constitutes a cartridge provided with a filtering medium, preferably excelsior moistened or dampened with oil.

The invention consists in the details of construction and in the combination and arrangement of the several parts of my improved filter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a longitudinal sectional view taken through an air filtering device constructed in accordance with an embodiment of my invention;

Fig. 2 is a view in elevation of the upper end portion of the device as illustrated in Fig. 1; and Fig. 3 is a view in end elevation of the cartridge as herein employed.

As disclosed in the accompanying drawings, my improved filterer embodies a cylindrical member or pipe 1 of predetermined length and which, when in applied position, is fitted into or otherwise attached to the air intake pipe or the air inlet port of a carbureter. At a predetermined point intermediate its ends, the wall of the member or pipe 1 is provided with the inwardly extending annular rib or bead 2 disposed circumferentially of the member or pipe 1 and which rib or bead preferably presses.

C denotes the cartridge comprised in my improved filter and which embodies a cylindrical member or casing 3 of requisite length and having its lower end portions intersected by a reticulated plate or screen 4 of close mesh and which serves as a head to properly retain the filler 5 within the cartridge. The filler 5 preferably comprises excelsior dampened or moistened by oil so that as the air passes through the filter, the filler 5 within the cartridge C will collect all dust or other foreign matter which may be contained within the air so that the air, as it leaves the filter and enters the carbureter, or the like, is free of impurities.

The casing 3 is of a length to extend beyond the pipe or cylindrical member 1 and said extended portion telescopes within the lower end portion of the cylindrical member or casing 6. The upper portion of the casing or member 6 has its bore reduced, as at 7, and is continued by an angularly disposed extension 8 terminating in a funnel like member 9. Disposed over the outer or open face of the funnel like member 9 is a reticulated plate or screen 10 of close mesh and which also serves to prevent gravel, insects, and the like to be drawn into the filter. The cylindrical member or casing 6 has the reduced portion of its bore continued by a depending annular flange 11 whereby the annular space *a* is provided between said flange 11 and the adjacent portion of the wall of the cylindrical casing 6 in which the upper end portion of the cylindrical member 3 of the cartridge C tightly fits and whereby an air-tight joint is effected. When the several parts of the filter are in assembled relation, the inner end portions of the cylindrical casings 1 and 6 also telescope.

When it is desired to cleanse my improved filter, the members or casings 1 and 6 are first separated which leaves a portion of the cartridge C exposed or extended beyond an end of the member or casing 6. This extended portion of the cartridge C may be readily grasped by the hand to facilitate its separation from the member 6. After the cartridge C has been separated from both the members or casings 1 and 6, the filter is thoroughly doused with gasolene, kerosene, or distillate, or the like, and then thoroughly shaken so as to remove all excessive oil. The parts of the filter are then reassembled and the device applied in working position.

It has been thoroughly demonstrated in practice that by having the filler 5 of excelsior, no interference or hindrance is given to the requisite adjustment of the carbureter or air intake.

From the foregoing description, it is thought to be obvious that a filter constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. An air filtering device of the character described comprising a tubular air inlet-member, a sleeve larger in diameter than the inlet member, one end portion of said sleeve being extended inwardly and secured to the inlet member, a portion of said inlet member extending inwardly of the sleeve in annular spaced relation to the sleeve, an air filtering cartridge having a flared end, said flared end being disposed between and frictionally engaging the inwardly extending portion of the inlet member and the sleeve, and a tubular member disposed between and frictionally engaging the cartridge and the sleeve.

2. An air filtering device of the character described comprising a tubular air inlet member, a sleeve larger in diameter than the inlet member, one end portion of said sleeve being extended inwardly and secured to the inlet member, a portion of said inlet member extending inwardly of the sleeve in annular spaced relation to the sleeve, an air filtering cartridge having a flared end, said flared end being disposed between and frictionally engaging the inwardly extending portion of the inlet member and the sleeve, and a tubular member having an annular shoulder extending inwardly of said member and adapted to support the opposite end of the cartridge, one end portion of said tubular member being disposed between the sleeve and the cartridge in spaced relation to the inlet member.

3. An air filtering device of the character described comprising a tubular air inlet member, a sleeve larger in diameter than the inlet member, one end portion of said sleeve being extended inwardly and secured to the inlet member, a portion of said inlet member extending inwardly of the sleeve in annular spaced relation to the sleeve, an air filtering cartridge having a flared end, said flared end being disposed between and frictionally engaging the inwardly extending portion of the inlet member and the sleeve, and a tubular member having an annular shoulder extending inwardly of said member and adapted to support the opposite end of the cartridge, one end portion of said tubular member being disposed between the sleeve and the cartridge in spaced relation to the inlet member, said tubular member being adapted to support the inlet member through the medium of the cartridge.

In testimony whereof I hereunto affix my signature.

GLEN D. SHERER.